US009256017B2

(12) United States Patent  
Sasaki

(10) Patent No.: US 9,256,017 B2  
(45) Date of Patent: Feb. 9, 2016

(54) OPTICAL TRANSMISSION MEDIUM BEND WORKING DEVICE AND OPTICAL TRANSMISSION MEDIUM BEND WORKING METHOD

(75) Inventor: Kyoichi Sasaki, Shizuoka (JP)

(73) Assignee: TOMOEGAWA CO., LTD., Tokyo (JP)

( * ) Notice: Subject to any disclaimer, the term of this patent is extended or adjusted under 35 U.S.C. 154(b) by 0 days.

(21) Appl. No.: 13/994,843

(22) PCT Filed: Dec. 19, 2011

(86) PCT No.: PCT/JP2011/079357  
§ 371 (c)(1),  
(2), (4) Date: Jun. 17, 2013

(87) PCT Pub. No.: WO2012/086585  
PCT Pub. Date: Jun. 28, 2012

(65) Prior Publication Data  
US 2013/0263628 A1    Oct. 10, 2013

(30) Foreign Application Priority Data  
Dec. 20, 2010  (JP) ................................. 2010-282731

(51) Int. Cl.  
*G02B 6/00*  (2006.01)  
*G02B 6/255* (2006.01)  
*G02B 6/36*  (2006.01)

(52) U.S. Cl.  
CPC ................ *G02B 6/00* (2013.01); *G02B 6/2552* (2013.01); *G02B 6/3612* (2013.01); *G02B 6/3616* (2013.01)

(58) Field of Classification Search  
CPC ........................... C03B 23/0066; C03B 37/15

USPC ..................................................... 65/402, 508  
See application file for complete search history.

(56) References Cited

U.S. PATENT DOCUMENTS 4,028,081 A *   6/1977  Marcatili ......................... 65/392  
2008/0016917 A1* 1/2008  Miyamoto et al. .............. 65/488  
(Continued)

FOREIGN PATENT DOCUMENTS

CN  1305191 A      7/2001  
JP  A-2000-338340  12/2000  
JP  A-2002-131560   5/2002  
(Continued)

OTHER PUBLICATIONS

Derwent abstract of JP 57-061637, Kadonami et al. Method of Tube Bending for Circular Fluorescent Lamp., Apr. 14, 1982.*  
(Continued)

*Primary Examiner* — Queenie Dehghan  
(74) *Attorney, Agent, or Firm* — Oliff PLC

(57) ABSTRACT

An optical transmission medium bend working device that reduces bending loss of an optical transmission medium includes: an arc-discharge electrode that partially and sequentially heats a bend working area of a tape core wire in an up-down direction, the tape core wire extending in the up-down direction with a distal end thereof being located on a lower side, the bend working area being located above the distal end; a core wire holding unit that holds a portion of the tape core wire located above the bend working area; and a bending arm that applies force to the tape core wire in a state where the bend working area is heated to bend the tape core wire at the bend working area.

14 Claims, 7 Drawing Sheets

(56) References Cited

U.S. PATENT DOCUMENTS

2008/0187273 A1* 8/2008 Clark et al. .................. 385/96
2011/0198765 A1   8/2011 Sasaki

FOREIGN PATENT DOCUMENTS

| | | |
|---|---|---|
| JP | A-2010-072044 | 4/2010 |
| JP | A-2010-262144 | 11/2010 |
| WO | WO 2010/044273 A1 | 4/2010 |

OTHER PUBLICATIONS

International Search Report issued in International Application No. PCT/JP2011/079357 dated Jan. 24, 2012 (with translation).

Feb. 13, 2015 Office Action issued in Chinese Patent Application No. 201180060389.3.

* cited by examiner

OPTICAL TRANSMISSION MEDIUM BEND WORKING DEVICE AND OPTICAL TRANSMISSION MEDIUM BEND WORKING METHOD

TECHNICAL FIELD

The present invention relates to an optical transmission medium bend working device and an optical transmission medium bend working method for bending an optical transmission medium in a state where a bend working area of the optical transmission medium is heated.

BACKGROUND ART

With regard to techniques for shaping an optical transmission medium such as an optical fiber, techniques disclosed in Patent Literature 1 and Patent Literature 2 are known, for example.

Patent Literature 1 discloses a technique of bending an optical transmission medium by pressing a portion of an optical transmission medium extending in a horizontal direction against a shaping jig disposed under the optical transmission medium while heating a portion of the optical transmission medium so that the optical transmission medium curves around the shaping jig.

In addition, Patent Literature 2 discloses a technique of bending an optical transmission medium extending in a horizontal direction by heating a portion of the optical transmission medium using arc discharge.

CITATION LIST

Patent Literatures

Patent Literature 1: JP 2010-72044 A
Patent Literature 2: WO 2010/044273 A

SUMMARY OF INVENTION

Technical Problem

However, in the technique disclosed in Patent Literature 1, since the optical transmission medium is bent in a state where the optical transmission medium is pressed against the shaping jig, scratches such as fine cracks are likely to be formed in a portion that makes contact with the shaping jig. If scratches such as cracks are present, bent portions of the optical transmission medium may be easily broken.

In addition, in the technique of Patent Literature 2, since bend working is performed without using the shaping jig, scratches such as cracks are rarely formed. However, the heated optical transmission medium may be bent by its own weight into a shape different from a desired shape, and the bending loss of the optical transmission medium during transmission of light may increase.

In view of the above, an object of the present invention is to provide an optical transmission medium bend working device and an optical transmission medium bend working method capable of reducing bending loss of an optical transmission medium by making scratches rarely be formed in the optical transmission medium and improving accuracy for bending the optical transmission medium into a desired shape.

Solution to Problem

An optical transmission medium bend working device according to the present invention to achieve the above object includes: a heating means for heating a bend working area of an optical transmission medium extending in an up-down direction with a distal end located on a lower side, the bend working area being located above the distal end; a holding means for holding a portion of the optical transmission medium located above the bend working area; and a bending means for applying force to the optical transmission medium in a state where the bend working area is heated to bend the optical transmission medium at the bend working area.

According to the optical transmission medium bend working device of the present invention, since the bend working area of the optical transmission medium extending in the up-down direction is bent, a shaping jig that supports the bend working area from the lower side is not required, and it is possible to prevent the shaping jig from making scratches on the optical transmission medium. Moreover, since the optical transmission medium is prevented from being bent in a shape different from an intended bent shape due to its own weight, it is possible to bend the bend working area in a desired shape with high accuracy and to reduce the bending loss of the optical transmission medium.

Here, the heating means may partially and sequentially heat a heated area of the optical transmission medium in the up-down direction, the heated area having a smaller length in the up-down direction than the bend working area.

In addition, the bending means may apply force to a portion of the optical transmission medium located on the lower side than the bend working area in a state where the bend working area is heated to thereby bend the optical transmission medium at the bend working area.

In addition, the optical transmission medium may be a plurality of optical transmission lines which are arranged at equal intervals in a width direction and which is assembled together.

In addition, the optical transmission medium bend working device may further include a moving means for moving at least one of the optical transmission medium and the heating means in the up-down direction to allow the heating means to partially and sequentially heat the bend working area along the up-down direction.

Here, the moving means may move the holding means downward.

In the optical transmission medium bend working device according to the present invention, the bending means preferably applies force to an intermediate position between the bend working area and the distal end of the optical transmission medium.

Since the bending means applies force to the intermediate position, which is a gravity center position of a distal end-side portion of the optical transmission medium located closer to the distal end than the bend working area, the weight of the distal end-side portion can be received by the bending means in a well-balanced manner during the bend working, and the influence of the weight on the bend working area can be suppressed further. Since the influence of the weight is suppressed further, it is possible to bend the bend working area in a desired shape with high accuracy and to reduce the bending loss of the optical transmission medium.

In addition, the bending means may rotate the distal end of the optical transmission medium in a state where the bend working area is heated.

In the optical transmission medium bend working device according to the present invention, the bending means preferably applies force in a direction where the bend working area approaches the heating means.

Accordingly, the bend working area of the optical transmission medium will not be moved away from the heating means, and the occurrence of bend working defects due to insufficient heating of the bend working area is prevented.

In the optical transmission medium bend working device according to the present invention, the heating means may heat the bend working area in a non-contacting manner.

Since the optical transmission medium is heated in a non-contacting manner, it is possible to prevent the occurrence of cracks on the optical transmission medium resulting from contacting of the heating means and the optical transmission medium.

In the optical transmission medium bend working device according to the present invention, the heating means may be an arc-discharge electrode.

Further, an optical transmission medium bend working method according to the present invention to achieve the above object includes: a setting step of setting an optical transmission medium extending in an up-down direction with a distal end located on a lower side on a holding means; and a bend working step of applying force to the optical transmission medium in a state where a bend working area between the holding means and the distal end of the optical transmission medium is heated to thereby bend the optical transmission medium at the bend working area.

According to the optical transmission medium bend working method of the present invention, the shaping jig is not required, and it is possible to prevent the shaping jig from making scratches on the optical transmission medium. Moreover, it is possible to bend the bend working area of the optical transmission medium in a desired shape with high accuracy and to reduce the bending loss of the optical transmission medium.

Here, the bend working step may be a step of applying force to a portion of the optical transmission medium located on the lower side than the bend working area to thereby bend the optical transmission medium at the bend working area.

In the optical transmission medium bend working method according to the present invention, the bend working step may be a step of applying force to an intermediate position between the bend working area and the distal end of the optical transmission medium to thereby bend the optical transmission medium.

In the optical transmission medium bend working method according to the present invention, the bend working step may be a step of applying force in a direction where the bend working area approaches a heating means for heating the bend working area.

In the optical transmission medium bend working method according to the present invention, the bend working step may be a step of heating the bend working area in a non-contacting manner.

In the optical transmission medium bend working method according to the present invention, the bend working step may be a step of heating the bend working area using an arc-discharge electrode.

Advantageous Effects of Invention

According to the present invention, it is possible to provide an optical transmission medium bend working device and an optical transmission medium bend working method capable of reducing bending loss of an optical transmission medium by making scratches such as cracks rarely be formed in the optical transmission medium and improving accuracy for bending the optical transmission medium into a desired shape.

DESCRIPTION OF EMBODIMENTS

Hereinafter, an embodiment of an optical transmission medium bend working device according to the present invention and an optical transmission medium bend working method using the optical transmission medium bend working device will be described with reference to the drawings. In this embodiment, a case of bending an optical transmission medium with a constant radius of curvature will be described as an example.

Figure 1:
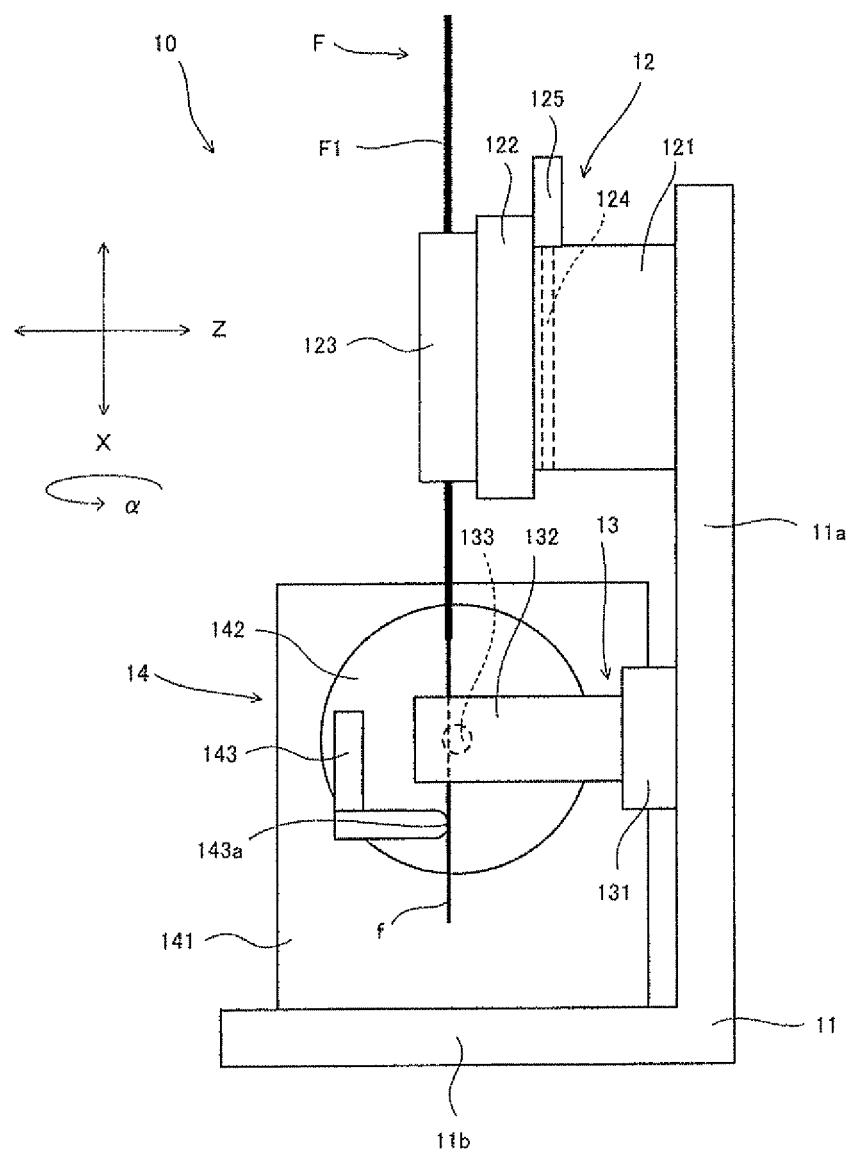
FIG. 1 is a side view of an optical transmission medium bend working device which is an embodiment of an optical transmission medium bend working device according to the present invention.
Figure 2:
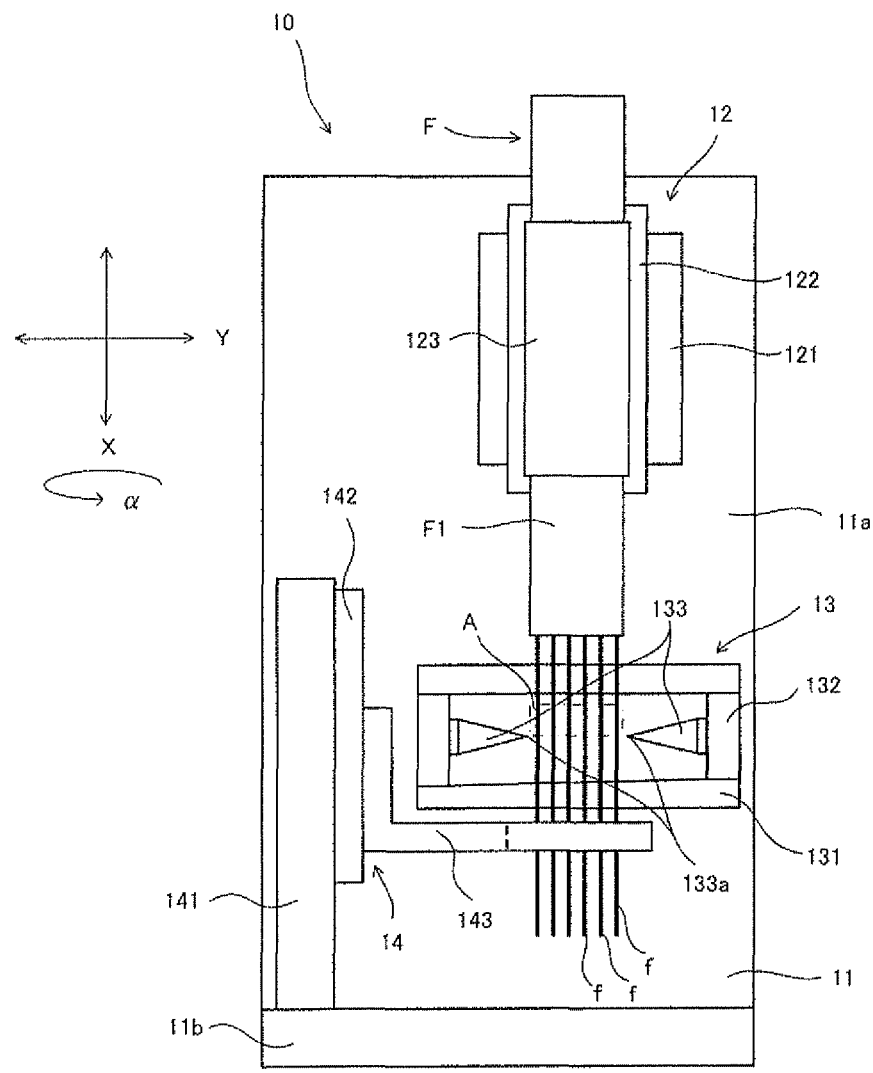
FIG. 2 is a front view of the optical transmission medium bend working device illustrated in FIG. 1.

FIG. 1 is a side view of an optical transmission medium bend working device which is an embodiment of an optical transmission medium bend working device according to the present invention, and FIG. 2 is a front view of the optical transmission medium bend working device illustrated in FIG. 1. In the drawings, arrows indicating respective axial directions and the like of the optical transmission medium bend working device are illustrated.

An optical transmission medium bend working device 10 illustrated in FIG. 1 is a device for bending a tape core wire F. The tape core wire F is an optical fiber assembly in which a plurality of glass optical fibers f arranged at equal intervals in a width direction (a direction perpendicular to the sheet of FIG. 1, that is, a Y-axis direction of the optical transmission medium bend working device 10) perpendicular to an extension direction (an up-down direction of FIG. 1, that is, an X-axis direction of the optical transmission medium bend working device 10) is assembled together. The tape core wire F corresponds to an example of an optical transmission medium according to the present invention. The optical transmission medium bend working device 10 is a device that can bend a plurality of optical fibers f at a time. The optical fiber subjected to bend working may be formed from an optional material such as glass or plastic, and the material can be selected appropriately according to application. However, a glass optical fiber is preferred in order to maintain the curvature accurately. Moreover, the number of optical fibers processed at a time is not limited, and only one optical fiber may be bent.

The optical transmission medium bend working device 10 illustrated in FIG. 1 includes an L-shaped bracket 11, a fiber holding unit 12, an electrode unit 13, and a rotary unit 14. The L-shaped bracket 11 includes a standing portion 11a and a pedestal portion 11b. The fiber holding unit 12 and the electrode unit 13 are attached to the standing portion 11a.

The fiber holding unit 12 includes a holding pedestal 121 fixed to the standing portion 11a, a holding position adjustment pedestal 122, and a core wire holding unit 123. The holding position adjustment pedestal 122 is attached to the holding pedestal 121 so as to be movable in the X-axis direction. As illustrated in FIG. 1, in the present embodiment, the x-axis direction of the optical transmission medium bend working device 10 is a direction parallel to the direction of gravity, which is vertical direction. A moving mechanism 124 that moves the holding position adjustment pedestal 122 in the X-axis direction is assembled into the holding pedestal 121. The moving mechanism 124 is a ball screw that transforms rotational motion into translational motion, for example. A holding unit motor 125 is connected to the moving mechanism 124. When the holding unit motor 125 is driven, the moving mechanism 124 operates and the holding position adjustment pedestal 122 moves in the X-axis direction at an optional speed. The core wire holding unit 123 is attached to the holding position adjustment pedestal 122. The holding position adjustment pedestal 122 includes an adjustment mechanism that is not illustrated. This adjustment mechanism finely adjusts the positions of the core wire holding unit 123 in the X-axis direction, Y-axis direction, Z-axis direction, and a-axis direction (a direction of rotation around the X-axis). The tape core wire F is held by the core wire holding unit 123. The core wire holding unit 123 corresponds to an example of a holding means according to the present invention.

The tape core wire F is set on the core wire holding unit 123 when the core wire holding unit 123 holds a portion where a coating F1 is present in a state where the coating F1 extending a predetermined length (for example, 100 mm) from the distal end is removed. If the coating F1 in a bend working area A described later is removed, the tape core wire F may be set on the core wire holding unit 123 in a state where the coating F1 in the distal end portion of the tape core wire F is left without being removed. In FIGS. 1 and 2, the lower side of the figures is the distal end side of the tape core wire F, and the upper side of the figures is the rear end side of the tape core wire F. Although not illustrated in the figures, the tape core wire F continues further to the rear end side. Although individual optical fibers f are exposed in a portion of the tape core wire F where the coating F1 is removed, since the rear end side is coated, the tape core wire F is also arranged at equal intervals in the width direction in this portion.

As illustrated in FIG. 1, the tape core wire F is set on the core wire holding unit 123 in a state where the tape core wire F extends in the vertical direction. The vertical direction in the present embodiment corresponds to an example of an up-down direction according to the present invention. A portion of the tape core wire F set on the core wire holding unit 123, located closer to the distal end than the portion held by the core wire holding unit 123 and extending toward the lower side maintains linearity due to the rigidity of the tape core wire F.

Figure 3:
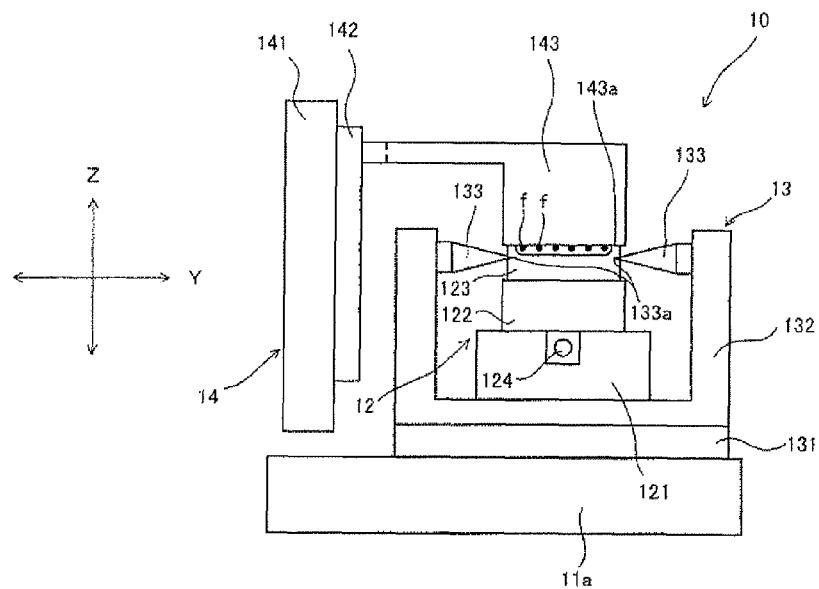
FIG. 3 is a bottom view of the optical transmission medium bend working device illustrated in FIG. 2 as seen from the lower side while seeing through a pedestal portion.

Here, the description will be continued with reference to FIG. 3 as well as FIGS. 1 and 2.

FIG. 3 is a bottom view of the optical transmission medium bend working device 10 illustrated in FIG. 2 as seen from the lower side while seeing through the pedestal portion 11b.

The electrode unit 13 includes an electrode position adjustment pedestal 131, a square U-shaped bracket 132, and a pair of arc-discharge electrodes 133. The electrode position adjustment pedestal 131 is fixed to the standing portion 11a. The square U-shaped bracket 132 is attached to the electrode position adjustment pedestal 131. The electrode position adjustment pedestal 131 includes an adjustment mechanism that is not illustrated. This adjustment mechanism finely adjusts the position of the square U-shaped bracket 132 in the X-axis direction and Z-axis direction. The pair of arc-discharge electrodes 133 is fixed to the square U-shaped bracket 132 in a state where electrode distal ends 133a face each other with a gap interposed in the Y-axis direction. The pair of arc-discharge electrodes 133 corresponds to an example of a heating means according to the present invention. The pair of arc-discharge electrodes 133 partially and sequentially heats the bend working area A (a portion of each of the optical fibers f surrounded by a two-dot chain line in FIG. 2) between the distal end of the tape core wire F and the core wire holding unit 123 along the vertical direction in a non-contacting manner by arc-discharge. The bend working area A is an area of the tape core wire F subjected to bend working, and the length in the vertical direction is the same as the moving length of the core wire holding unit 123 in the X-axis direction during bend working. The length in the vertical direction of a partially heated area (hereinafter referred to as a heated area) of the tape core wire F is smaller than the length in the vertical direction of the bend working area A. Since the pair of arc-discharge electrodes 133 heats the tape core wire F in a non-contacting manner, there is no concern that the tape core wire F is damaged.

As illustrated in FIG. 1, the rotary unit 14 is attached to the pedestal portion 11b. The rotary unit 14 includes a frame 141 fixed to the pedestal portion 11b, a rotary stage 142 formed to be rotatable on the frame 141, and a bending arm 143 fixed to the rotary stage 142. The rotary stage 142 includes a rotary unit motor that is not illustrated. When the rotary unit motor is driven, the rotary stage 142 rotates at an optional angular speed. The bending arm 143 makes contact with the tape core wire F to apply force to the tape core wire F to thereby perform bend working of the tape core wire F. Thus, the bending arm 143 corresponds to an example of a bending means according to the present invention.

As illustrated in FIG. 1, a contacting-side end portion 143a of the bending arm 143 on a side where the bending arm 143 makes contact with the tape core wire F is formed in an arc shape in a side view. The contacting-side end portion 143a makes contact with the tape core wire F at an intermediate position between the bend working area A of the tape core wire F and the distal end of the tape core wire F to apply force to the tape core wire F with rotation of the rotary stage 142. The intermediate position between the bend working area A and the distal end of the tape core wire F is a gravity center position of a distal end-side portion (a lower portion of the tape core wire F) closer to the distal end than the bend working area A. Since the bending arm 143 applies force to the gravity center position, the weight of the distal end-side portion can be received by the bending arm 143 in a well-balanced manner during bend working. Since the weight of the distal end-side portion is received by the bending arm 143 in a well-balanced manner, it is possible to bend the bend working area A of the tape core wire F with a desired radius of curvature with high accuracy. That is, if force is applied to a position other than the gravity center position, due to a difference between the weight of the tape core wire F extending from the force application position to the distal end and the weight of the tape core wire F extending from the force application position to the heated area, a rotational moment is generated in the force application position on the distal end-side portion of the tape core wire F located closer to the distal end than the heated area. If this rotational moment is large, there is a concern that the tape core wire F is deformed in a direction different from the direction of the force applied by the bending arm 143. In the present embodiment, the rotational moment is suppressed to be very small by applying force to the gravity center position.

As illustrated in FIG. 1, the bending arm 143 makes contact with the tape core wire F from the opposite side of the arc-discharge electrode 133 and applies force in a direction where the bend working area A (see FIG. 2) of the tape core wire F approaches the arc-discharge electrode 133 to thereby perform bend working of the tape core wire F. That is, in the X-Z, plane illustrated in FIG. 1, the bending arm 143 applies force in a direction where the bend working area A of the tape core wire F approaches a straight line that connects the electrode distal ends 133*a* of the pair of arc-discharge electrodes 133. Since the bending arm 143 applies force in this direction, the bend working area A of the optical transmission medium will not be moved away from the arc-discharge electrode 133, and the occurrence of bend working defects due to insufficient heating of the bend working area is prevented.

Figure 4:
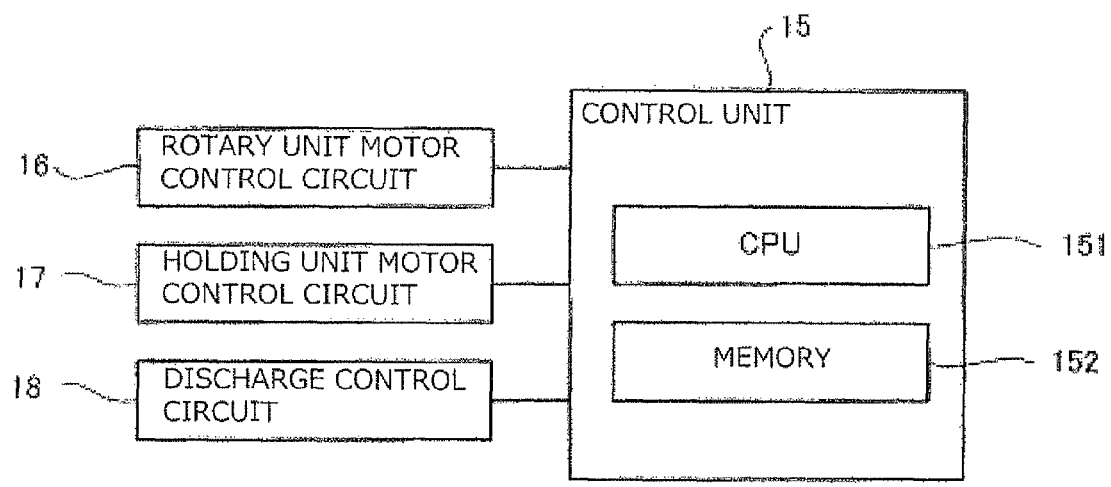
FIG. 4 is a block diagram illustrating a circuit configuration of the optical transmission medium bend working device according to the present invention.

FIG. 4 is a block diagram illustrating a circuit configuration of the optical transmission medium bend working device 10.

A control unit 15 is connected to a rotary unit motor control circuit 16, a holding unit motor control circuit 17, and a discharge control circuit 18. Moreover, the control unit 15 includes a central processing unit (CPU) 151 and a memory 152. An operation program of the optical transmission medium bend working device 10 is stored in the memory 152. The CPU 151 reads the operation program stored in the memory 152 and issues a command to the respective control circuits according to the operation program. The rotary unit motor control circuit 16 is a circuit that controls a rotation speed of the rotary unit motor according to the command from the CPU 151. The holding unit motor control circuit 17 is a circuit that controls a rotation speed of the holding unit motor 125 according to the command from the CPU 151. The discharge control circuit 18 is a circuit that controls the magnitude of a voltage or a current applied to the pair of arc-discharge electrodes 133 according to the command from the CPU 151.

Next, an optical transmission medium bend working method using the optical transmission medium bend working device 10 will be described. The optical transmission medium bend working method described in the present invention includes a setting step and a bend working step.

As illustrated in FIG. 2, in the setting step, the tape core wire F extending in the vertical direction is set on the core wire holding unit 123 so that an end portion of the remaining coating F1 is located above the a pair of arc-discharge electrodes 133.

Subsequently, the X-axis direction, the Y-axis direction, and the α-axis direction of the tape core wire F is appropriately adjusted using the adjustment mechanism of the holding position adjustment pedestal 122. Subsequently, the position in the Z-axis direction of the tape core wire F is adjusted.

Figure 5:
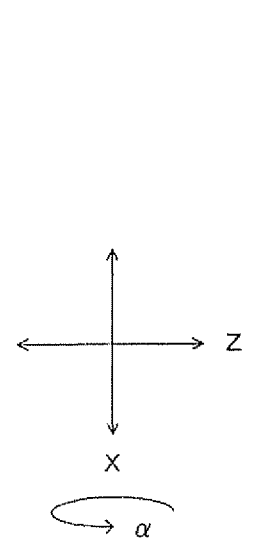
FIG. 5($a$) is an enlarged view illustrating an optical fiber and the center of rotation of a rotary stage and FIG. 5($b$) is a view schematically illustrating a tape core wire heated by a pair of arc-discharge electrodes.
Figure 5:
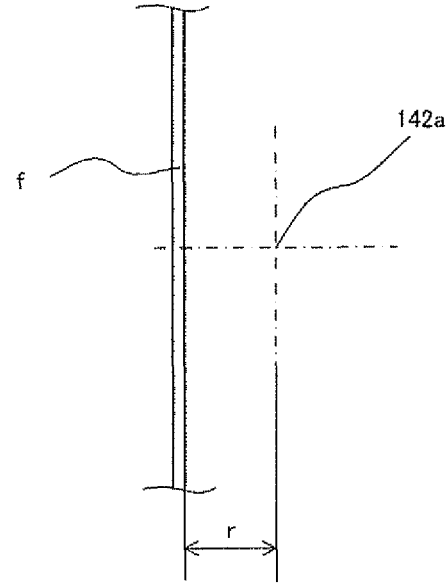
Figure 5:
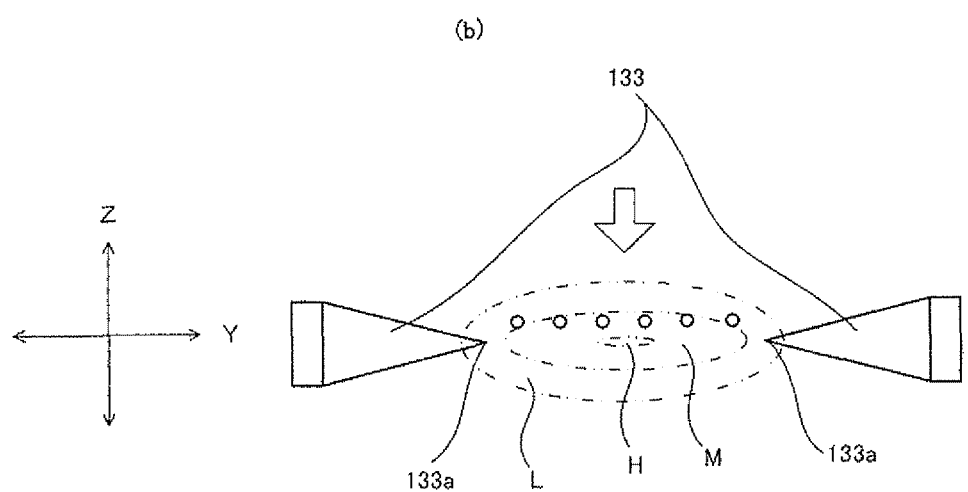

FIG. 5(*a*) is an enlarged view illustrating the optical fiber and the center of rotation of the rotary stage.

As illustrated in FIG. 5(*a*), the distance between the optical fiber f and the center of rotation 142*a* of the rotary stage 142 is adjusted using the adjustment mechanism of the holding position adjustment pedestal 122 so that the distance is the same as a desired radius of curvature r in the Z-axis direction. Finally, the separation distance between the set tape core wire F and a straight line that connects the electrode distal ends 133*a* of the pair of arc-discharge electrodes 133 is adjusted using the adjustment mechanism of the electrode position adjustment pedestal 131.

Here, the separation distance between the tape core wire F and the straight line that connects the electrode distal ends 133*a* of the pair of arc-discharge electrodes 133 will be described with reference to FIG. 5(*b*). FIG. 5(*b*) is a view schematically illustrating the tape core wire F heated by the pair of arc-discharge electrodes.

The arc-discharge generated between the pair of arc-discharge electrodes 133 has such a temperature distribution that the temperature gradually decreases as it is away from the center between the pair of arc-discharge electrodes 133 so that the center between the pair of arc-discharge electrodes 133 is a high temperature area H, a medium temperature area M is around the high temperature area, and a low temperature area L is around the medium temperature area. The high temperature area H mentioned herein is an area in which the temperature increases as the tape core wire F is damaged. As illustrated in FIG. 5, when seen from below the optical transmission medium bend working device 10, the temperature distribution of the respective temperature areas of the arc-discharge has an elliptical shape of which the long axis extends in the Y-axis direction. A temperature area suitable for bending of the tape core wire F is the medium temperature area M, and the temperature in the low temperature area L is too low so that it is difficult to bend the tape core wire F in the low temperature area L. When the plurality of optical fibers f arranged in the width direction is arranged so as to cross the center between the pair of arc-discharge electrodes 133, some of the optical fibers f may fall in the high temperature area H, and the optical fiber f may be damaged. Thus, all of the plurality of optical fibers f arranged in the Y-axis direction needs to be outside the high temperature area H. That is, the distance (separation distance) in the Z-axis direction between the respective optical fibers f and the straight line that connects the electrode distal ends 133*a* of the arc-discharge electrodes 133 needs to be set such that all optical fibers f are outside at least the high temperature area H.

In the bend working step, the respective control circuits operate according to the command from the control unit 15, and bend working is performed on the tape core wire F while heating the tape core wire F in a non-contacting manner with the arc-discharge generated between the pair of arc-discharge electrodes 133. The control unit 15 issues a command to the discharge control circuit 18 to cause the arc-discharge electrode 133 to start arc-discharge to heat the tape core wire F in a non-contacting manner. Subsequently, the control unit 15 outputs a driving command to the rotary unit motor control circuit 16. When the state of FIG. 1 in which the contacting-side end portion 143*a* of the bending arm 143 is in contact with the tape core wire F is created, a driving command is output to the holding unit motor control circuit 17. When the respective motors start driving based on these commands, the core wire holding unit 123 moves downward at an optional speed, and the rotary stage 142 rotates counterclockwise in FIG. 1 at an optional speed. That is, the bending arm 143 makes contact with the tape core wire F at the intermediate position between the bend working area A of the tape core wire F and the distal end of the tape core wire F to apply force to the tape core wire F so that the distal end of the tape core wire F rotates counterclockwise in FIG. 1. In the tape core wire F, the bend working area A is continuously heated and microscopic bend working is continuously performed to form a bent portion. The moving speed of the core wire holding unit 123 and the moving speed of the rotary stage 142 have a speed ratio corresponding to the required radius of curvature r as will be described later.

In the bend working step, the bending arm 143 applies force in a direction where the bend working area A of the tape core wire F approaches the arc-discharge electrode 133 whereby the bend working of the tape core wire F is performed. FIG. 5 illustrates the force application direction by an empty arrow. As illustrated in FIG. 5, a heated area of the optical fiber f at the end portion in the width direction among the optical fibers f arranged in the width direction may be present in the low temperature area L. In this case, it is not possible to perform bend working on the optical fiber f at the end portion in the width direction due to insufficient heating.

A distal end-side portion of the optical fiber f of which the heated area is present in the low temperature area L, located closer to the distal end than the portion held by the core wire holding unit 123 is bent toward the rotation direction about a portion near the lower end of the core wire holding unit 123 with rotation of the rotary stage 142. In the present embodiment, since force is applied by the bending arm 143 in a direction where the bend working area A approaches the arc-discharge electrode 133, the distal end-side portion of the optical fiber f is bent in a direction where the portion approaches a higher temperature area. Due to this bending, the heated area of the optical fiber f, which has been in the low temperature area L, can fall into the medium temperature area M. Since the optical fiber f of which the heated area is present in the medium temperature area M is softened at the heated area to be bent, the optical fiber f will not be further bent and will not fall into the high temperature area H. In FIG. 5, although the optical fiber f at the end portion in the width direction has been in the low temperature area L before force is applied to the bending arm 143, the optical fiber f falls into the medium temperature area M with rotation of the rotary stage 142 and desired bend working is performed.

Figure 6:
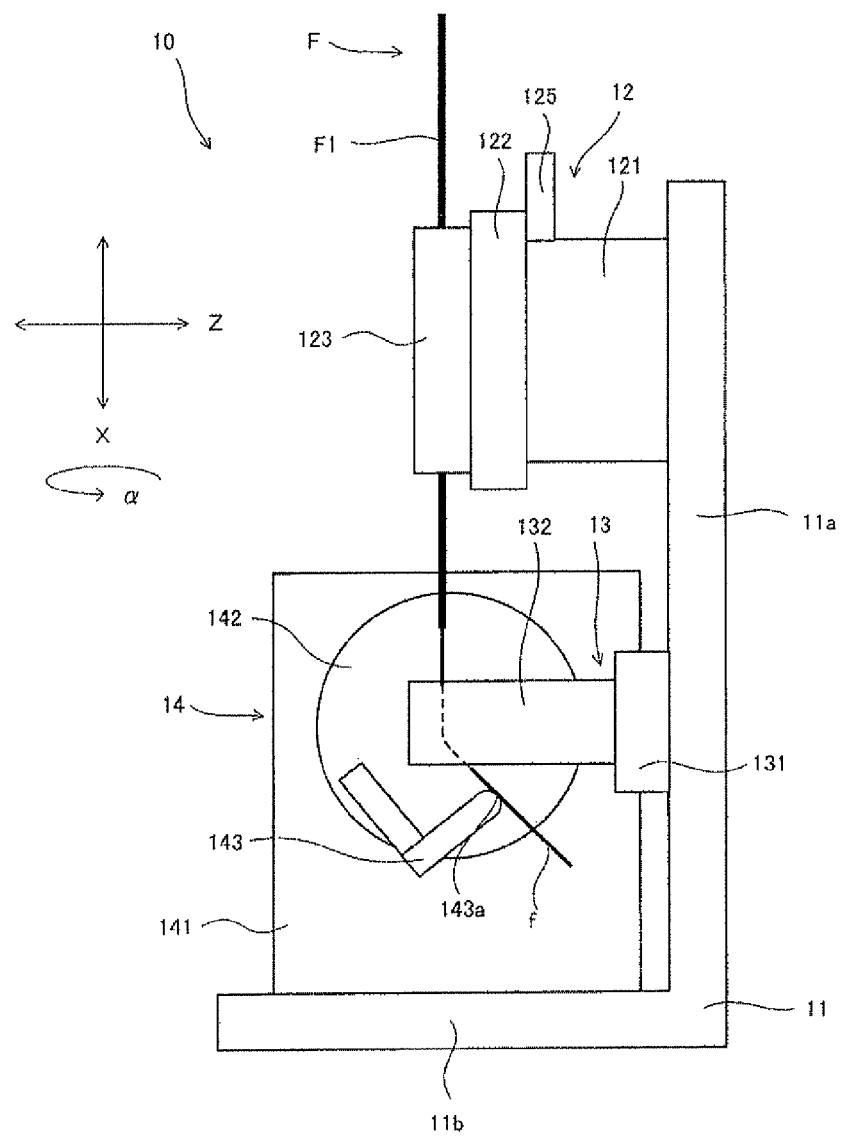
FIG. 6 is a view illustrating a state where a bending arm is rotated by 45° from the state of FIG. 1.
Figure 7:
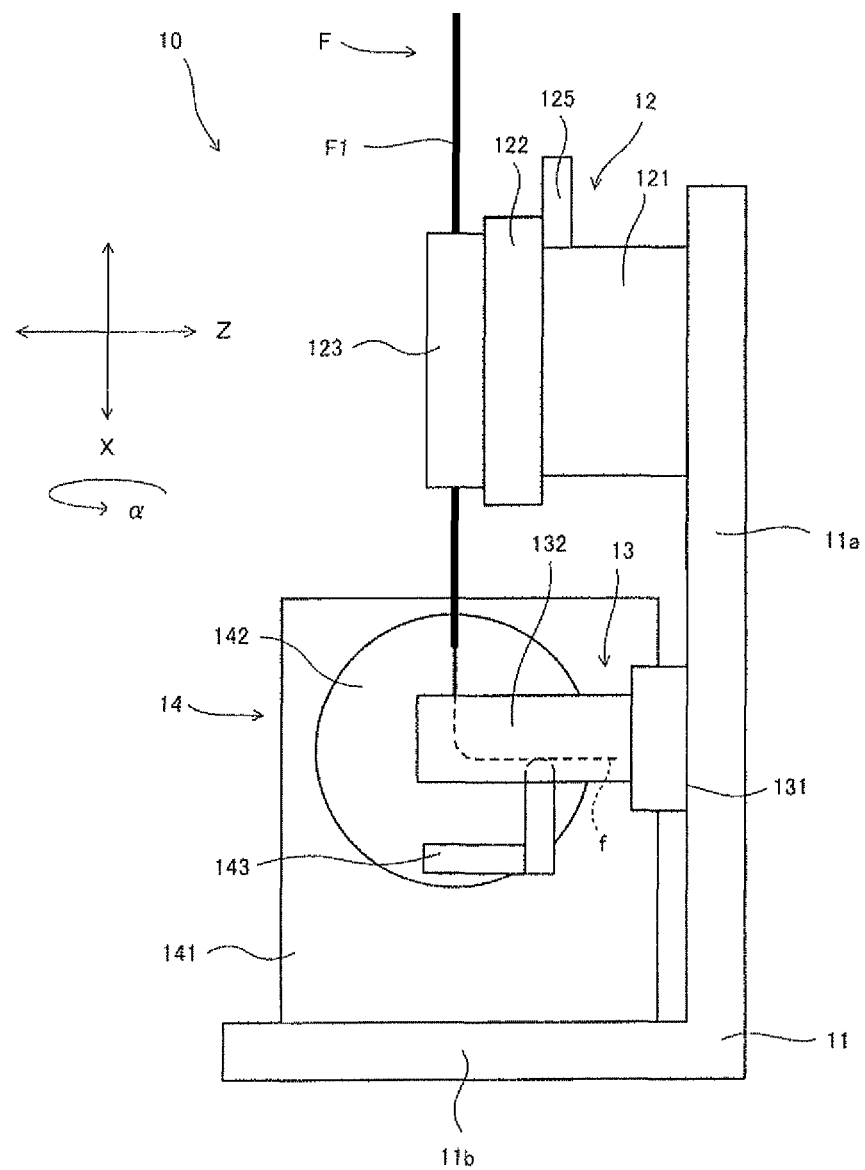
FIG. 7 is a view illustrating a state where the bending arm is rotated by 90° from the state of FIG. 1.

FIG. 6 is a view illustrating a state where the bending arm 143 is rotated counterclockwise by 45° from the state of FIG. 1 where the contacting-side end portion 143a of the bending arm 143 is in contact with the tape core wire F, and FIG. 7 is a view illustrating a state where the bending arm 143 is rotated counterclockwise by 90° from the state of FIG. 1.

As illustrated in FIGS. 6 and 7, the heated area of the tape core wire F can be bent with a radius of curvature corresponding to the moving speed of the core wire holding unit 123 and the angular speed of the bending arm 143, and all optical fibers f arranged in the width direction can be bent with the same radius of curvature. Thus, by setting the moving speed of the core wire holding unit 123 and the angular speed of the bending arm 143 to a desired speed, all optical fibers f arranged in the width direction can be bent with a desired radius of curvature r with high accuracy.

The relation between the moving speed of the core wire holding unit 123, the angular speed of the rotary stage 142, and the radius of curvature of the bend working portion of the optical fiber f can be obtained in the following manner.

It is assumed that a moving distance of the core wire holding unit 123 is S (mm), and a desired radius of curvature is r (mm). The moving distance S is the same as the distance in the vertical direction of the bend working area A.

When a bending angle of the bend working portion of the optical fiber f is θ (rad), the length of the bent portion of the optical fiber f is r·θ (mm).

Here, since the moving distance S is identical to the length r·θ of the bend working portion, S=r·θ.

When the distance is expressed by a change per unit time, the following equation is obtained.

$$dS/dt = (r \cdot d\theta)/dt \quad (1)$$

Since dS/dt is the moving speed V (mm/s) of the core wire holding unit 123, and dθ/dt is the angular speed ω (rad/s) of the rotary stage 142, the equation (1) can be expressed as follows.

$$V = r\omega \quad (2)$$

Thus, the radius of curvature r can be expressed as follows.

$$r = V/\omega \quad (3)$$

In this manner, the ratio of the moving speed V of the core wire holding unit 123 to the angular speed w of the rotary stage 142 can be obtained from the desired radius of curvature r.

Thus, if the moving speed V is constant, for example, the angular speed ω may be increased when the radius of curvature r is small, and the angular speed ω may be decreased when the radius of curvature is large.

By changing the moving speed V or the angular speed a during the bend working, it is possible to obtain an optical fiber f having an optional bending shape having a plurality of radii of curvature.

When the bend working step ends, natural cooling is performed, and after that, the tape core wire F is removed from the optical transmission medium bend working device 10, and the bend working of the tape core wire F ends. By using the optical transmission medium shaping method described above, it is possible to manufacture a bent tape core wire F.

By repeating the optical transmission medium shaping method according to the present invention, it is also possible to manufacture an optical transmission medium having at least two curvatures. Specifically, by sequentially bending a plurality of positions of an optical transmission medium, it is possible to form an S-shaped optical fiber. By using an optical transmission medium in which the optical path is freely changed as described above, it is possible to manufacture an optical circuit having a reduced size.

As described above, according to the optical transmission medium bend working device 10 according to the present embodiment, since bend working is performed in the heated area of the tape core wire F without making contact with the shaping jig or the like, there is no concern that scratches such as cracks are formed on the tape core wire F.

Moreover, in the optical transmission medium bend working device 10 according to the present embodiment, since the bend working is performed on the tape core wire F set in a state of extending in the vertical direction, the accuracy for bending in a desired shape is improved. That is, if the tape core wire F set in a state of extending in the horizontal direction is subjected to bend working, the weight of the portions of the optical fibers f that constitute the tape core wire F, located closer to the distal end than the heated area acts in a direction perpendicular to the extension direction of the optical fibers f, force that bends the optical fibers if is applied to the heated area. As a result, the force may cause the optical fiber f softened in the heated area to be bent, and the bending may progress at a higher bending speed than the angular speed ω of the bending arm. In this case, the optical fiber f is bent by its own weight contrary to an intended way of bending (bending speed), and it is not possible to bend the optical fiber f in a desired shape. In the optical transmission medium bend working device 10 according to the present embodiment, since bend working is performed on the tape core wire F that extends in the vertical direction, in the initial stage of bend working, the weight of the portion of the optical fibers f that constitute the tape core wire F, located closer to the distal end than the heated area acts only in the direction (the downward direction in FIG. 1) of pulling the optical fiber f and does not act in the direction of bending the optical fiber f. Moreover, in a stage where the bend working has progressed, since bend working is performed while the bending arm 143 supports the weight on the side closer to the distal end than the heated area, the influence of weight decreases. Since the influence of weight decreases, the optical fiber if softened in the heated area is suppressed from being bent by its own weight. Thus, it is possible to perform bend working in a desired shape with high accuracy and to decrease bending loss of the tape core wire F which has been subjected to bend working.

Moreover, according to the present embodiment, even if the heated area of the tape core wire F is softened considerably, since bending due to its own weight is suppressed, it is not necessary to strictly control the separation distance between the tape core wire F and the straight line that connects the electrode distal ends 133a of the pair of arc-discharge electrodes 133. That is, if the tape core wire F set in a state of extending in the horizontal direction is subjected to bend working, the speed of bending due to the weight increases as the degree of softening in the heated area of each of the optical fibers f that constitute the tape core wire F increases, and the bending progresses at a higher speed than the angular speed ω of the bending arm. Thus, it is necessary to strictly control the separation distance between all optical fibers f that constitute the tape core wire F and the arc-discharge electrodes 133 so that the heating temperature is equal to or higher than an annealing point and lower than a softening point. The softening point mentioned here is a value measured in accordance with JIS R 3103-1, and the annealing point is a value measured in accordance with JIS R 3103-2. In the present embodiment, since bend working is performed on the optical fiber f that extends in the vertical direction, bending due to its own weight is suppressed. Even when the optical fiber if is softened considerably in the heated area, it is possible to perform bend working in a desired shape with high accuracy. That is, since bending due to the weight is suppressed, even when the heating temperature slightly exceeds the softening point, it is possible to perform bend working in a desired shape with high accuracy. Since the range of heating temperatures allowed for the bend working increases, even when the optical fiber f approaches the pair of arc-discharge electrodes 133 considerably closely, it is possible to perform bend working in a desired shape with high accuracy. As a result, it is not necessary to strictly control the separation distance between the optical fiber f and the straight line that connect the electrode distal ends 133a of the pair of arc-discharge electrodes 133 as compared to the case where bend working is performed on the tape core wire F set in a state of extending in the horizontal direction.

The present invention is not limited to the above-described embodiment but various modifications can be made within the scope described in the claims. For example, in the above description, although a pair of arc-discharge electrodes 133 is used, the respective optical fibers f may be heated using a heating element 135 as illustrated in FIG. 8 instead of the pair of arc-discharge electrodes 133.

Figure 8:
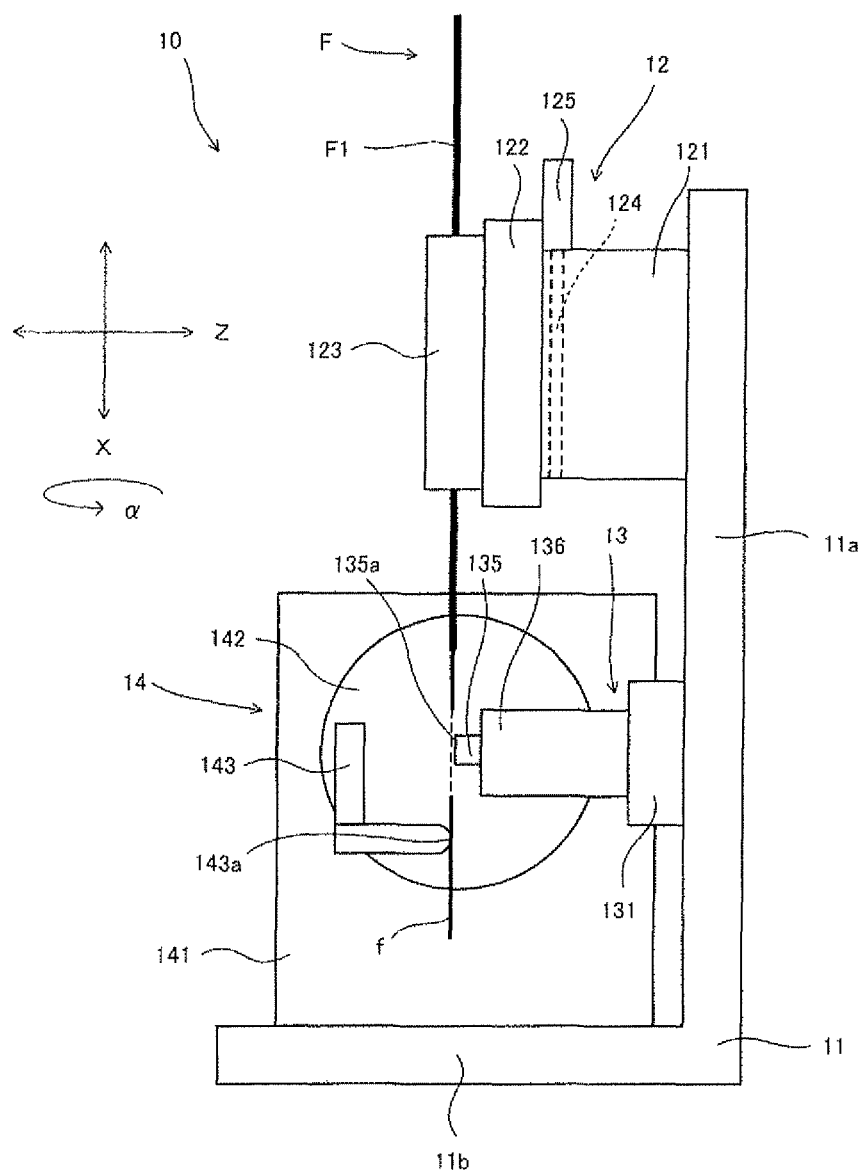
FIG. 8 is a side view illustrating a modification of the optical transmission medium bend working device illustrated in FIG. 1.

FIG. 8 is a side view illustrating a modification of the optical transmission medium bend working device illustrated in FIG. 1.

In the modification illustrated in FIG. 8, components having the same names as the names of the components described above are denoted by the same reference numerals as used above, and description thereof is not provided. The heating element 135 is formed from a ceramic material having high heat resistance such as alumina, a silicon carbide, or a silicon nitride, and a resistance heater is included inside the ceramic material. The heating element 135 is fixed to a prismatic bracket 136 with a small gap interposed between the optical fibers f and a heating surface 135a of the heating element 135 so as to heat the optical fibers using the heat radiated from the heating surface 135a. Another heating means (for example, a burner or the like) for heating the optical fibers f in a non-contacting manner may be used instead of the heating element 135. Further, the optical fibers f may be heated in a state of being in contact with the heating element 135, and another contacting heating means may be used. However, from the perspective of heating optical fibers efficiently at high temperature, the arc-discharge electrode is preferable.

In addition, in the present embodiment, although the tape core wire F extending in the vertical direction is held, the tape core wire F that is inclined in the vertical direction may be held by the core wire holding unit 123 as long as it is in the range where the tape core wire F is not bent with its own weight. The range where the tape core wire F is not bent with its own weight is a range determined by conditions such as the mass of the tape core wire F on the side closer to the distal end than the heated area or the heating temperature. That is, the up-down direction in the present invention includes not only the vertical direction but also a direction in which the tape core wire F is inclined from the vertical direction within a range where the tape core wire F is not bent with its own weight during the bend working. However, since the influence of the weight can be reduced as the direction is closer to the vertical direction, the tape core wire F extending in the vertical direction or approximately in the vertical direction with the distal end of the tape core wire F being located on the lower side is preferably held by the core wire holding unit 123.

In addition, in the present embodiment, although the contacting-side end portion 143a of the bending arm 143 makes contact with the tape core wire F at the intermediate position between the bend working area A and the distal end of the tape core wire F to apply force, the contacting-side end portion 143a may make contact with another position of the tape core wire F to apply force as long as the position is lower than the bend working area A.

In addition, in the present embodiment, although during the bend working, the position of the arc-discharge electrode 133 is fixed and the core wire holding unit 123 is moved downward, the core wire holding unit 123 may be fixed and the pair of arc-discharge electrodes 133 may be moved upward. Alternatively, both the core wire holding unit 123 and the pair of arc-discharge electrodes 133 may be simultaneously moved in the vertical direction. Further, bend working may be performed in a state where both the core wire holding unit 123 and the pair of arc-discharge electrodes 133 are fixed. In addition, the bending arm 143 may be fixed to the L-shaped bracket 11, and a stage for rotating the core wire holding unit 123 may be provided so that the core wire holding unit 123 is rotated about the center of rotation 142a. Furthermore, both the bending arm 143 and the core wire holding unit 123 may be rotated.

In addition, in the present embodiment, although the height position of the rotary unit 14 is fixed, the height position may be changed. These modifications may be appropriately combined.

Hereinafter, the present invention will be described further with reference to examples.

EXAMPLES

Example

An L-shaped bracket made from aluminum was prepared as the L-shaped bracket 11 illustrated in FIG. 1. A step motor-driven ball screw-type automatic X-axis stage was prepared as the fiber holding unit 12 that holds the optical fiber f and was fixed to a wall (the standing portion 11a illustrated in FIG. 1) of the L-shaped bracket made from aluminum. In addition, an automatic O-axis rotary stage that is driven with a step motor was prepared as the rotary unit 14, and the automatic O-axis rotary stage was fixed to a bottom surface (the pedestal portion 11b illustrated in FIG. 1) of the L-shaped bracket made from aluminum.

In addition, a square U-shaped bracket made from glass epoxy was prepared as the square U-shaped bracket 132 illustrated in FIG. 1. The pair of arc-discharge electrode was connected to an arc-discharge power supply (a diversion of an optical fiber fusion device manufactured by Furukawa Electric Co., Ltd). Moreover, electrode bars of both negative and positive electrodes of the arc-discharge electrode were face-to-face fixed to the square U-shaped bracket made from glass epoxy, and the square U-shaped bracket was fixed to the wall of the L-shaped bracket.

A crystal optical fiber (GI 62.5 multi-mode, cladding diameter 0.125 mm, coating outer diameter 0.245 mm, manufactured by Furukawa Electric Co., Ltd) was used as an optical fiber, and the coating extending as far as 100 mm from the distal end was removed. Moreover, the rear end side where the coating was left was fixed to the automatic X-axis stage with the distal end facing downward and extending in the vertical direction.

In addition, the separation distance between the optical fiber and the straight line that connects distal ends of the electrode of the arc-discharge electrodes was adjusted to approximately 1 mm, and arc-discharge was performed in a non-contacting manner so that the optical fiber glows.

The moving speed of the automatic X-axis stage was set to 2 mm/s, and the automatic O-axis stage was controlled to be rotated by 90° while performing arc-discharge.

The test was repeated while changing the angular speed ω of the automatic O-axis stage in six steps from 1.55 to 0.85, and the radius of curvature and the bending loss of the optical fiber having been subjected to bend working were measured.

Comparative Example

The optical transmission medium bend working device used for Example was rotated by 90°, and an optical fiber extending in the horizontal direction was held on an automatic X-axis stage with the wall of the L-shaped bracket as a bottom surface (the optical transmission medium bend working device in FIG. 1 was rotated clockwise by 90°). Bend working was performed with the other conditions the same as those of Example to obtain an optical fiber of Comparative Example.

The measured results are shown in Table 1.

Table 1 shows examples in which the angular speed ω was changed in the respective horizontal rows. The angular speed ω is shown on the leftmost column, and the theoretical radius of curvature (mm) obtained with the angular speed ω is shown on its right column. The theoretical value is a value obtained according to Equation (3) described above. This table shows the measured results of the radius of curvature and the bending loss (dB) of the optical fibers obtained for Example and Comparative Example. The higher the bending accuracy of the optical fiber, the lower becomes the bending loss.

Evaluation

As is clear from Table 1, at any angular speed Co from 1.55 to 0.85, the radius of curvature obtained for Example is closer to the theoretical value than Comparative Example. Moreover, at any angular speed ω, the optical fiber of Example can considerably suppress the bending loss more than Comparative Example. Further, the optical fiber of Example can suppress the bending loss to be 1 dB or smaller at any angular speed ω.

REFERENCE SINGS LIST

10: OPTICAL TRANSMISSION MEDIUM BEND WORKING DEVICE
123: CORE WIRE HOLDING UNIT
133: ARC-DISCHARGE ELECTRODE
143: BENDING ARM
F: TAPE CORE WIRE
F1: COATING
A: BEND WORKING AREA

The invention claimed is:

1. An optical transmission medium bend working device comprising:
    a heating mechanism for heating a bend working area of an optical transmission medium extending in an up-down direction with a distal end located on a lower side, the bend working area being located above the distal end;
    a holding mechanism for holding a portion of the optical transmission medium located above the bend working area; and
    a bending mechanism including a bending arm for applying force to the optical transmission medium at a portion of the optical transmission medium that is not at the bend working area while the bend working area is heated by the heating mechanism, the force applied in a direction opposite to a side of the bending mechanism where the bending arm is located to bend the optical transmission medium at the bend working area resulting from rotation of a rotary stage that is coupled to the bending arm.

2. The optical transmission medium bend working device according to claim 1, wherein:
    the bending mechanism is configured to bend the optical transmission medium at the bend working area by applying force to a gravity center position between the bend working area and the distal end of the optical transmission medium.

3. The optical transmission medium bend working device according to claim 1, wherein:
    the bending mechanism applies force in a direction towards the heating mechanism.

4. The optical transmission medium bend working device according to claim 3, wherein:
    the heating mechanism is provided on only one side of the optical transmission medium.

TABLE 1

| | | Example | | Comparative example | |
|---|---|---|---|---|---|
| Angular speed (rad/s) | Theoretical radius of curvature (mm) | Measured radius of curvature (mm) | Bending loss (dB) | Measured radius of curvature (mm) | Bending loss (dB) |
| 1.55 | 1.29 | 1.31 | 1.00 | 1.25 | 3.32 |
| 1.35 | 1.48 | 1.52 | 0.75 | 1.46 | 2.91 |
| 1.25 | 1.60 | 1.60 | 0.57 | 1.57 | 2.51 |
| 1.15 | 1.74 | 1.69 | 0.35 | 1.67 | 2.33 |
| 1.05 | 1.90 | 1.91 | 0.26 | 1.85 | 1.90 |
| 0.85 | 2.35 | 2.34 | 0.20 | 2.27 | 1.71 |

5. The optical transmission medium bend working device according to claim 1, wherein:
the heating mechanism heats the bend working area in a non-contacting manner.

6. The optical transmission medium bend working device according to claim 5, wherein:
the heating mechanism is an arc-discharge electrode.

7. The optical transmission medium bend working device according to claim 1, wherein:
the bending mechanism is configured to apply force to the bend working area while the optical transmission medium is moved in a downward direction by the holding mechanism.

8. The optical transmission medium bend working device according to claim 1, wherein:
the bending mechanism is configured to apply force to the bend working area by contacting the portion of the optical transmission medium that is not at the bend working area.

9. The optical transmission medium bend working device according to claim 1, wherein the heating mechanism includes arc-discharge electrodes that heat the bend working area in a non-contacting manner, and further comprising:
a pedestal portion; and
a rotary unit coupled to the pedestal portion, the rotary unit including a frame fixed to the pedestal portion, wherein the rotary stage is configured to be rotatable on the frame.

10. An optical transmission medium bend working method comprising:
setting an optical transmission medium extending in an up-down direction with a distal end located on a lower side on a holding mechanism; and
applying force with a bending arm of a bending mechanism, to the optical transmission medium at a portion of the optical transmission medium that is not at a bend working area, while the bend working area is heated by a heating mechanism, the force a direction opposite to a side of the bending mechanism her the bending arm is located to thereby bend the optical transmission medium at the bend working area resulting from rotation of a rotary stage that is coupled to the bending arm.

11. The optical transmission medium bend working method according to claim 10, wherein:
the applying force to the optical transmission medium comprises bending the optical transmission medium at the bend working area by applying force to a gravity center position between the bend working area and the distal end of the optical transmission medium to thereby bend the optical transmission medium.

12. The optical transmission medium bend working method according to claim 10, wherein:
the applying force to the optical transmission medium comprises applying force in a direction towards the heating mechanism for heating the bend working area.

13. The optical transmission medium bend working method according to claim 10, wherein:
the applying force to the optical transmission medium comprises heating the bend working area in a non-contacting manner.

14. The optical transmission medium bend working method according to claim 13, wherein:
the applying force to the optical transmission medium comprises heating the bend working area using an arc-discharge electrode.

* * * * *